United States Patent [19]

Goffman

[11] Patent Number: 5,594,897
[45] Date of Patent: Jan. 14, 1997

[54] METHOD FOR RETRIEVING HIGH RELEVANCE, HIGH QUALITY OBJECTS FROM AN OVERALL SOURCE

[75] Inventor: William Goffman, Bratenahl, Ohio

[73] Assignee: GWG Associates, New York, N.Y.

[21] Appl. No.: 115,318

[22] Filed: Sep. 1, 1993

[51] Int. Cl.⁶ .................................................. G06F 17/30
[52] U.S. Cl. .................................. 395/613; 364/DIG. 1; 364/282.1; 395/614
[58] Field of Search ..................... 364/DIG. 1, DIG. 2; 395/600

[56] References Cited

U.S. PATENT DOCUMENTS

| | | | |
|---|---|---|---|
| 4,468,732 | 8/1984 | Raver | 395/600 |
| 4,479,196 | 10/1984 | Perrer et al. | 395/600 |
| 5,201,046 | 4/1993 | Goldberg et al. | 395/600 |
| 5,241,673 | 8/1993 | Schelvis | 395/600 |
| 5,303,367 | 4/1994 | Leenstra, Sr. et al. | 395/600 |
| 5,418,948 | 5/1995 | Turtle | 395/600 |

OTHER PUBLICATIONS

W. Goffman, "A Pragmatic Approach to Literature Selection", from *Selectivity Information Systems*, Praeger Scientific, 1991.

T. Saracevic, "Experiences with ... High Quality Collection of Journals ... ", IFLA General Conference 1990, Stockholm.

Primary Examiner—Thomas G. Black
Assistant Examiner—Maria N. Von Buhr
Attorney, Agent, or Firm—Ostrager, Chong & Flaherty

[57] ABSTRACT

A method is provided for selecting a core collection of objects from an overall source collection. The objects have directed relations with each other, and a frequency measure of these directed relations is used as an approximation of the probability that one object has relevance to another. The method is particularly applicable to selecting a core collection of journals from an overall collection, wherein the object relation is journal citation. The selection method includes as procedural steps: (1) selecting a most frequently cited journal as a starter journal; (2) computing the frequencies of citation of other journals by the starter journal as measures of probability of relevance; (3) selecting a threshold relevance value, identifying the journals having relevance probabilities exceeding the threshold, then repeating the step for each identified journal until no new journals are identified; (4) determining dominance relations between every two journals identified; and (5) ordering the selected journals according to their dominance relations.

13 Claims, 14 Drawing Sheets

1

METHOD FOR RETRIEVING HIGH RELEVANCE, HIGH QUALITY OBJECTS FROM AN OVERALL SOURCE

TECHNICAL FIELD

The invention relates to an objective method for retrieving high relevance, high quality objects from a larger set of objects. Although the method is applicable to any discrete set of elements, its most fruitful application is to the retrieval of documents from an information source, particularly scientific papers, and to the selection of efficient core collections of journals for scientific libraries.

BACKGROUND

Automated information retrieval systems have been operating for several decades. Information retrieval can generally be thought of as a question and answer process in which users query an information source of objects (generally sets of documents or journals) seeking relevant information of quality. Most operating retrieval systems, both government and commercial, are based on the so called Boolean strategy. The term Boolean is used to denote that queries are represented by propositions in an algebra of propositions, and answers by subsets of objects of the information source, both of which constitute Boolean algebras. As a consequence, to every query there corresponds a unique subset of objects.

Although the Boolean strategy is very attractive due to its simplicity, it is quite ineffective. Most of the major defects in this approach result from the fact that Boolean logic countenances fallacies of relevance due to the notion of strict implication. The more recent attempts at applying "fuzzy logic" or weighting procedures do not materially alter the situation. Moreover, as far as is known, no operating information retrieval system attacks the problem of the quality of the information retrieved. Among the many serious consequences of these approaches is that information conveyed by any object in the source is independent of the information conveyed by any other object, which is clearly absurd. Moreover, in the case of the strict Boolean strategy, objects must be either completely relevant or completely non-relevant because of the two-valued nature of Boolean logic.

The exponential increase in costs of library and reference publications together with the continuing exponential growth of scientific information has led to the need for small yet effective and affordable library collections. Thus libraries and other institutions using scientific information can not sustain a policy of buying and maintaining large and expensive collections of publications in the hope of capturing the useful material.

At present there are three general methods for selecting core collections of journals from an overall collection. These are: (1) expert consensus; (2) use studies; and (3) impact factor. However, all of these approaches have serious defects. Expert consensus is extremely subjective, time consuming and difficult to implement since the most qualified experts are loathe to participate in such an enterprise. Use studies are very costly and time consuming. They are also difficult to update and are clearly local in character. Selection by impact factor also has problems. The impact factor of a journal is defined as the average number of citations per published item over a previous two year period. This data is available in the Journal Citation Reports (JCR) published annually by the Institute for Scientific Information that lists raw citation data from over 4,000 scientific publications covering all major subject areas of science. The impact factor is supposed to constitute a measure of quality and correct for the various sizes of scientific publications. However, the impact factor is not a measure in the mathematical sense since it does not have the additive property required of a measure. Moreover, its claim of representing quality is also suspect since all citations are treated equally. That is, citation by a high quality journal counts as much as citation by a journal of poor quality.

Selection of core collections of journals might be treated as an information retrieval problem in which journals are to be selected on the basis of quality and relevance.

SUMMARY OF THE INVENTION

The present invention provides an effective new method for the retrieval of objects from an overall set of objects on the basis of relevance and quality. It is general in nature, hence is applicable to a whole variety of situations, most notably the retrieval of scientific papers and journals. The operational definition of relevance in this approach is such that it also entails quality. It thus corrects for the inability of existing approaches to identify either relevant or quality information. Moreover, the implementation of this method is found to be neither costly nor time consuming.

In order to correct for the problems posed by the conventional retrieval strategies, the notion of probability of relevance is introduced. Consider a query "q" and a source of information conveying objects "S". Let $P_q(s)$ denote the probability that s in S is relevant to q. Assume that with every query q there is associated a critical probability "t" that $P_q(s)$ must exceed for "s" to be relevant to "q". The critical probability can thus be thought of as a relevance threshold and probabilities of individual elements in the source S as measures of their relevance to the query. The relevance threshold is thus the dividing line between the barely relevant and the not-quite relevant.

Since the information conveyed by two different elements in S may not be independent, the relevance of information conveyed by one may either enhance or inhibit the relevance of the information conveyed by the other. It is thus necessary to introduce a dependency relation between elements of S.

Let $P_{ij}$ be the conditional probability that $s_j$ in S is relevant to some query q if $s_i$ in S is relevant to q and let $r_j(q)$ be the initial probability that $s_j$ is relevant to q. Since q is arbitrary, $P_{ij}$ does not depend on q but only on the informational relationship between $s_i$ and $s_j$.

Consider an arbitrary sequence of elements in S:

$$s_0, s_1, \ldots, s_j, \ldots, s_n.$$

The probability of relevance of the jth element in the sequence, $$j=0, 1, \ldots, n,$$

can be defined as follows:

$$P_q(s_0) = r_0(q)$$

$$P_q(s_j) = r_j(q) + ((P_{j-1,j} - r_j(q)) P_q(s_{j-1})$$

Given an arbitrary threshold t, suppose that $$P_q(s_j) > t \text{ but } P_{j-1,j} < t$$

Then, $$r_j(q)+((t-r_j(q))\, P_q(s_{j-1})>t$$

or, $$P_q(s_{j-1})>1$$

which is an absurdity.

Thus, given an arbitrary sequence of the elements of S, a necessary condition that an element $s_j$ in S is relevant to a query q, is that its conditional probability of relevance, given the relevance of its immediate predecessor in the sequence, exceeds the threshold t.

Since the conditional probabilities $p_{ij}$ are independent of the query q, the source S can be structured a priori as follows.

Given elements $s_i$ and $s_j$ in S, and some arbitrary threshold t, then if $p_{ij}$ exceeds t, $s_i$ is said to "converse" with $s_j$, denoted by "$s_i$ c $s_j$".

A sequence of elements joining $s_i$ to $s_j$ such that $s_i$ c $s_{i+1}$ c ... c $s_{j-1}$ c $s_j$ is called a "communication chain" denoted by "$s_i$ C $s_j$"

Thus, communication, is a necessary condition for relevance.

If $s_i$ C $s_j$ and $s_j$ C $s_i$, then $s_i$ and $s_j$ are said to "intercommunicate", denoted by "$s_i$ I $s_j$".

An even stronger relevance relation between elements of S is one in which they bi-converse, denoted by "$s_i$ b $s_j$".

That is, if $s_i$ c $s_j$, then $s_j$ c $s_i$. A chain joining a sequence of elements such that adjacent ones bi-converse is called a "bi-communication chain", denoted by "$s_i$ B $s_j$".

The relation of conversance is reflexive but neither symmetric nor transitive; the relation of communication is reflexive and transitive but not symmetric; and both intercommunication and bi-communication are reflexive, symmetric and transitive. Consequently, communication establishes an order relation, and intercommunication and bi-communication equivalence relations on the elements of S.

Thus, communication establishes the order of relevance among the elements of the source S; intercommunication partitions S into disjoint classes such that every intercommunication chain passing through a given element must belong to the same class; and bi-communication partitions each intercommunication class into disjoint subclasses such that every bi-communication chain passing through a given element must belong to the same subclass. Consequently, three relevance relations of increasing strength, have been defined for the elements of the source S.

The length of a chain is defined as its number of links. Hence the length of a chain of n elements is n−1. For a given relevance threshold t, the shortest communication chain joining two elements in S constitutes a quasi-metric since (1) the shortest chain linking two elements is 0 if and only if the elements are identical and (2) the triangular inequality holds for such chains. However, they may not be symmetric. This also holds for intercommunication chains. On the other hand, the shortest bi-communication chain joining two elements constitutes a metric since all three required properties hold. Thus, for a given relevance threshold t, informational distances and quasi-distances can be established between elements of a source, and the shorter the distance the greater the relevance. If there is no chain linking two elements, the distance between them is said to be infinite, implying that they are in fact informationally independent.

As t varies between 0 and 1, a family of metric and quasi-metric spaces is defined on the source S. As t approaches 1, S breaks up into more classes containing fewer elements, whereas as t approaches 0, S approaches a single class containing all members of S. In the first case, the distances between elements approach infinity, whereas in the latter, the distances approach 1.

Although no element of an intercommunication class $S_i$ intercommunicates with any element in any other class $S_j$, such elements may converse. An intercommunication class $S_i$ is said to converse with an intercommunication class $S_j$ if there exists an element $s_i$ in $S_i$ that converses with an element $s_j$ in $S_j$.

An intercommunication class $S_i$ is said to communicate with an intercommunication class $S_j$ if there exists a sequence of classes linking $S_i$ to $S_j$ such that adjacent classes converse. Clearly, intercommunication classes cannot intercommunicate. On the other hand, bi-communication classes can converse, communicate and intercommunicate, but cannot bi-communicate.

Anderson and Belnap, as set forth in "*The Pure Calculus of Entailment*", published in 1962, by *The Journal of Symbolic Logic*, argued that relevance is essential to a valid logical argument, and proposed a set of axioms as capturing the notion of relevance without fallacies. These axioms require the relations of identity, transitivity, permutability, and self-distribution, which are clearly satisfied by the above relations of communication, intercommunication and bi-communication. Consequently, the described notion of relevance does not permit fallacies of relevance.

It is convenient and useful to describe the above relations in terms of graph theory. Any set together with a binary relation can be represented by a graph, where points stand for members of the set and lines for the relations. Thus, if two points are joined by a line, they stand in the given relation to each other. If the relation is directional, the graph is called a directed graph, or "digraph", and the lines "directed lines" or "arcs". A sequence of points directionally joining two elements of a digraph is called a "path", and one point is said to be "reachable" from the other. The shortest path linking two points is the quasi-distance between them. If two points are connected but not directionally connected, they are said to be joined by a "semipath".

A digraph is said to be "strong" if every two points are mutually reachable. It is said to be "unilateral" if for every two points at least one is reachable from the other, and it is said to be weak if every two points are joined by a semipath.

Every strong digraph is unilateral and every unilateral digraph is weak, but the converse is not true. A digraph is disconnected if it is not even weak.

An even stronger relation exists between connected points in a digraph, namely points that are connected only if they are bi-directionally connected. On the basis of this relation, every strong digraph can be partitioned into disjoint components in which all adjacent points are bi-directionally connected. Thus, a strong digraph can be represented by a disjoint set of ordinary subgraphs.

Of particular importance are certain subgraphs of an ordinary graph called blocks. A block is a maximal non separable subgraph, thus representing an even stronger relation among the points of a graph.

The strong components of a digraph are the most important not only because they represent strong relations between elements but because they yield a new digraph called a "condensation graph". In a condensation graph of a digraph, the points are strong components of the digraph and an arc from one component to the other means that there is at least one arc linking points belonging to each component.

Communication among elements of a source S can clearly be represented by a relevance digraph where points stand for discrete objects in S and lines for their relevance relations. Thus, an arc joining a point $s_i$ to a point $s_j$ means that $s_i$ converses with $s_j$. A path joining two points $s_i$ and $s_j$ means that $s_i$ communicates with $s_j$. Hence, a communication chain is a unilateral component and an intercommunication class a strong component of a relevance digraph of elements of the source. Clearly the bi-communication classes belonging to each intercommunication class can be represented by ordinary subgraphs of the relevance digraph, which in turn can be partitioned into blocks. The relevance relationships among intercommunication classes or bi-communication classes of objects can be represented by condensation graphs.

For every two connected points in a relevance digraph a more dominant element can be determined, i.e., wherein the probability that a more dominant element is relevant to a subservient element is greater than the probability a subservient element is relevant to a more dominant element. Clearly, for every subservient element there will be a most dominant element, namely the one whose probability of relevance to the subservient element is maximum. The dominance relation between elements can be represented by a special type of digraph called a "tree" in which points are connected by arcs from most dominant elements to their subservient ones. Points which have at least one subservient element in a dominance "tree" are the roots and branch points of the "tree".

Clearly, selection of the threshold value is crucial to the effectiveness of any application of this approach to the retrieval of objects from a larger set of objects. Thresholds are not arbitrarily set but are selected as the maximal relevance probabilities at which key structural changes occur in the relevance digraph as the threshold varies from 1 to 0. Since a block constitutes the strongest substructure representing the relevance relation among objects in the source, the highest threshold value for which the block containing the objects of interest merge with another block defines the first cutoff point. The next cutoff point would clearly be the highest probability for which the bi-communication class containing the objects of interest merges with another bi-communication class forming a larger class and so forth.

In the present invention, a method is provided for selecting high relevance sets of objects from an overall source set. The objects have directed relations with each other, and a frequency ratio of directed relations is used as an approximation of the probability that one object has relevance to another. Since the operational definition of relevance is given in terms of the frequency of occurrence of directed relations between objects, relevance entails quality if such relations are directed from quality objects. That is objects relevant to quality objects are themselves quality objects. The relevance probabilities of the object relations are then used objectively to select a core of high relevant, high quality objects. Graph theory is used to assess relations between objects and classes of objects.

The selection method comprises the following procedural steps in the selection of elements (1) selecting a starter element based on relevance and quality which constitutes the query in the retrieval process; (2) computing the relevance probabilities of other elements relative to the starter element based on their directed relations; (3) selecting a threshold relevance value, identifying all other objects whose probabilities of relevance to the starter object exceed the threshold, then repeating the step for each identified object until no new objects are identified and constructing their relevance digraphs; (4) determining dominance relations between every two objects upon comparison of their probabilities of relevance to each other; and (5) identifying the most dominant elements.

The present invention is particularly applicable to the retrieval of scientific journals and scientific papers of relevance and quality from overall collections of journals and papers in which the relevance relation is defined in terms of citations. Citation indexes are used to provide raw citation data. These data are used to compute relevance probabilities for the purpose of constructing relevance structures from which core collections of high relevance, high quality journals or papers can be selected based upon given threshold relevance values.

DETAILED DESCRIPTION OF THE INVENTION

In the present invention, a method is provided for selecting sets of relevant objects from an overall source collection. The objects have elemental relations with each other, which may be referred to as a directed "conversation" or "communication", and a frequency measure of these directed relations is used as an approximation of the probability that one object has relevance to another. The relevance probabilities of the object relations are then used objectively to determine a selection of core objects depending upon a selected threshold relevance value. The powerful tools of graph theory are also used to assess ordering, distances, and dominance between objects and classes of objects.

The method of the present invention is particularly applied to two major problems of information retrieval. These are the selection of effective and efficient core libraries of scientific journals from larger journal collections and the effective and efficient retrieval of scientific papers from larger sources. In both cases relevance relations are defined in terms of citation relations between journals and between papers. Citation is at present the most objective indicator of relevance and quality in the scientific literature. Moreover, citation indexes which record citations among large collections of scientific journals and scientific papers are published annually. These citation indexes provide the raw data for the relevance relations in these applications.

Figure 1A:
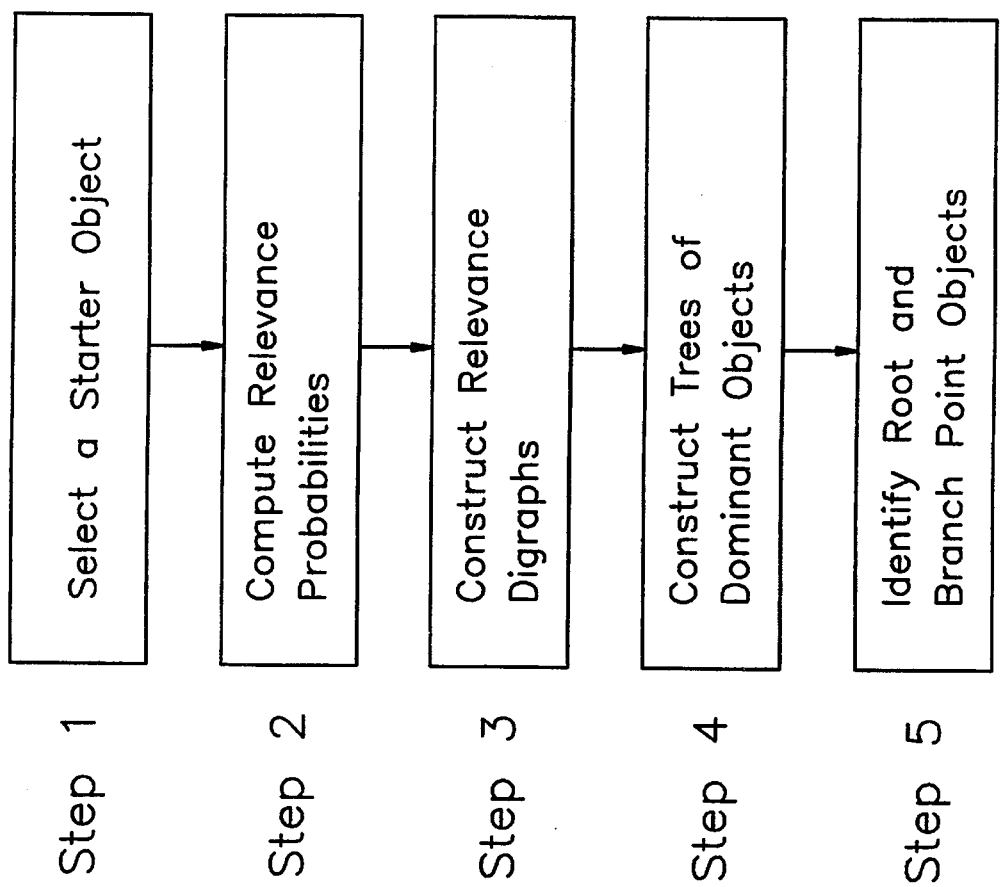
FIGS. 1a and 1b are procedural and data flow diagrams of the general method of object selection and its specific application to journal selection in the present invention.

With reference to FIG. 1a, the method of the present invention as applied to the problem of journal selection proceeds by the following steps:

Step 1: The citation index for a source collection of journals is scanned, and the most frequently cited journal for the subject area of interest is selected as a "starter" journal. Consequently, the "starter" journal represents a quality journal relevant to the subject of interest.

Step 2: The frequency by which the starter journal cites each other journal in the source collection divided by its total number of citations is computed. This is taken as an approximation of the probability of relevance to the starter journal.

Step 3: An appropriate threshold relevance value t is selected. From the starter journal and all journals whose probability of relevance exceeds the selected threshold relevance value t are identified. Keeping t constant, the procedures for computing the relevance probabilities and identification of journals exceeding the threshold are repeated for each of the journals selected from the starter journal, until no new journals are identified. The selected journals can be represented as relevance digraphs in graph theory. Journals can be ordered for relevance in terms of their distance from the starter journal. Thus an ordered collection of relevant journals of quality is identified.

Step 4: Construct the "trees" of dominant journals.

Step 5: Identify the roots and branch points of the "trees" constructed in step 4. These are the dominant journals of the set of selected journals thus representing a core collection of high relevance, high quality journals, whereas the entire set represents a comprehensive set of such journals.

The application of the method of the present invention to the problem of journal selection is illustrated in the following three examples. Example I illustrates selection of a core collection of journals for all of science. Example II illustrates the selection of a small set of journals relating to a narrow scientific subject, namely cell biology. Example III illustrates selection of a more general library of science journals relevant to the fields of marine biology and oceanography. In all three examples, verification of the method is provided.

EXAMPLE I

As a first example, the method of the present invention is applied to select a core collection of journals for all of science. The Journal Citation Reports (JCR) published annually by the Institute for Scientific Information lists raw citation data for over 4,000 scientific journals covering all major subject areas of science. For this example, the 1990 JCR list of scientific journals is taken as the source collection.

Step 1: Section 2 of the JCR ranks the journals in its source by frequency of citation. The most cited journal in 1990 was the *Journal of Biological Chemistry* (JBC), so it was taken as the starter journal.

Step 2: The citing journal section of the JCR lists citation frequency data for each of its source journals. This list contains either the most frequently cited 100 journals or those journals which accounted for 85% of all citations by the given source journal in the given year, here 1990. The number of times the JBC cited a journal divided by its total number of citations is taken as a suitable approximation of the probability that the JBC would cite that journal in the given year, hence the probability of relevance of the cited journal to the JBC as the starter journal. Table 1 shows the citation frequency information for the JBC in the 1990 listing. The total number of citations by the JBC was 133,458. It cited itself most frequently followed by the *Proceeding of the National Academy of Science* cited 11,081. The frequency ratios are computed and taken as the relevance probabilities. Thus the probability that P Nat Acad Sci is relevant to the JBC is 0.0830 (11,081/133,485) and so forth.

Figure 3:
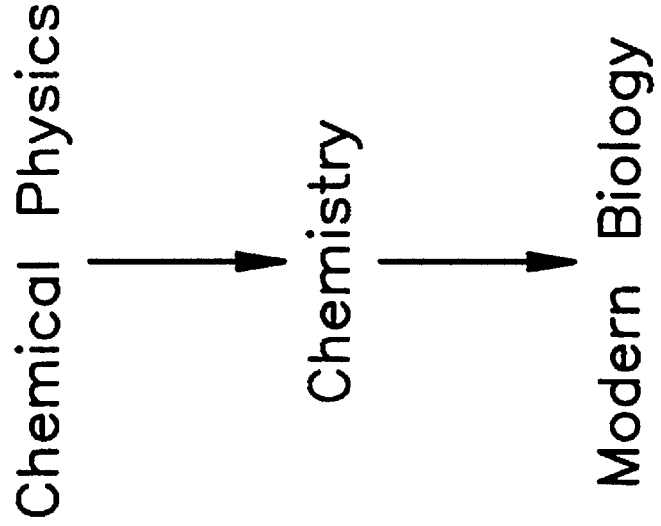
FIG. 3 illustrates a condensation graph for the example of FIG. 2.

Step 3: On the basis of these relevance probabilities, an ordered set of journals can be generated from the starting journal JBC by decreasing the threshold value until new journals are introduced. As the threshold is lowered, a new journal enters the list at the highest probability that it is cited by a journal already in the list. Table 2 illustrates the selection of new journals as the threshold t decreases from 1.000 to 0.0285. At t equals 0.0285 a new subject area is introduced, namely chemistry. The sets of journals together with their relevance arcs form weak digraphs. As t decreases the sets get larger and the distances between elements smaller. In FIG. 2, an example of the bi-communication classes (strong components) of the digraph generated from the starter journal JBC is shown for threshold value 0.0285. These strong components represent the various subject areas and blocks their sub areas. In FIG. 3, the condensation graph of these strong components shows the relevance relations among these different subject areas. A threshold value of 0.0200 is the highest probability for which a digraph containing journals representing all major scientific subjects is generated from the starter journal JBC. The threshold value of 0.0200 thus constitutes the first cutoff point for generating a core collection of journals covering all of science. In 1990 this digraph consists of 397 strongly connected journals selected for relevance and quality.

Figure 4:
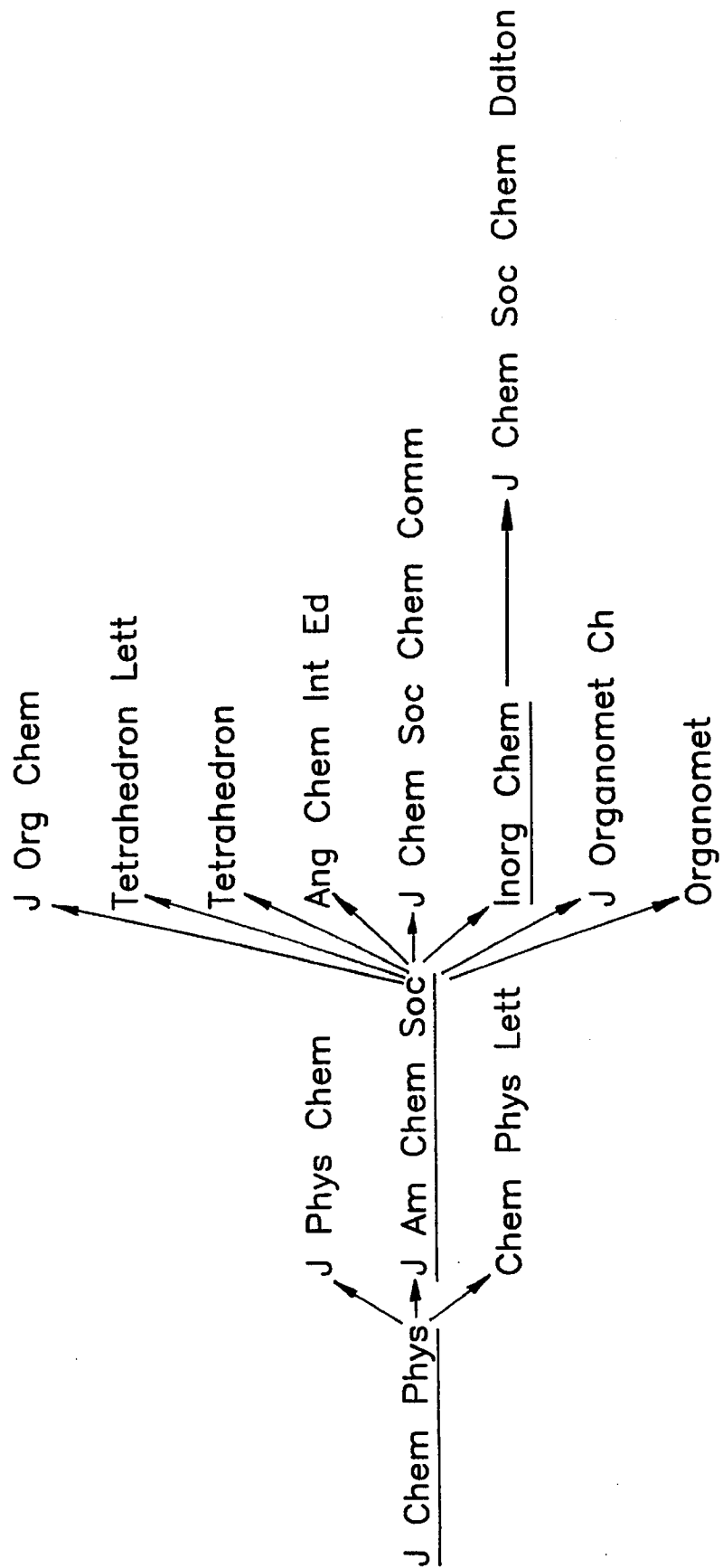
FIG. 4 illustrates a dominance tree for the journals of the physical sciences in the first example of FIG. 2.
Figure 5:
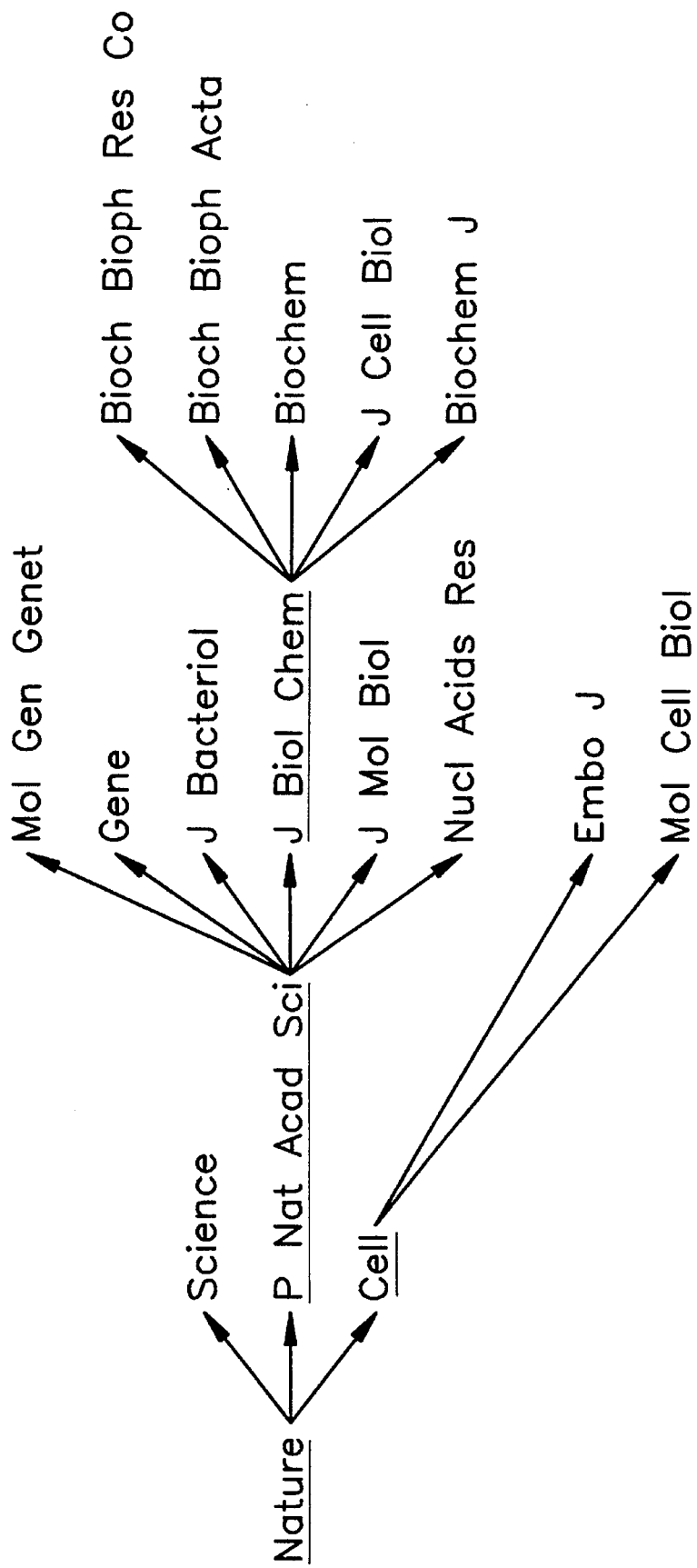
FIG. 5 illustrates a dominance tree for journals of the life sciences in the first example of FIG. 2.

Step 4: The dominance relations for every two journals in the relevance digraph are determined. In FIGS. 4 and 5, trees of dominant journals are illustrated for the classes of physical science and life science at threshold value 0.0285.

Step 5: List all root and branch point journals which constitute the dominant journals of the collections selected for relevance and quality from the starter journal. The set of 397 titles encompassing all major scientific subject areas contained 128 root and branch point journals. This set constitutes the smallest core collection of quality journals covering all of science whereas the total set of 397 constitutes the smallest comprehensive set. Of the twenty most cited journals in the 1990 JCR, 19 are root or branch points. Moreover, in all cases, the most highly cited journal of each subject area as represented by a block of a bi-communication class in the relevance digraph is a root or branch point journal. These 397 strongly connected titles accounted for 54% of all citations of the over 4,000 journals in the JCR source.

EXAMPLE II

This example illustrates the objective of selecting a small collection of journals relating to a narrow scientific subject. Cell biology is the selected subject. The method of the present invention is to be verified against an established rating system used in this field in 1990. The citation data used for this test should therefore be the most current data available at the start of 1990, hence the 1988 JCR published in late 1989 was used.

Step 1: The most cited cell biology journal in the 1988 JCR was the journal *Cell*, which was cited 63,776 times.

Step 2: The citing journal section of the 1988 JCR listed 36 journal titles accounting for 85% of the citations by *Cell* in that year. The total number of citations by *Cell* was 18,711 in 1988. It cited itself most frequently, followed by the *Proceedings of the National Academy of Science* cited 2,175 times. The frequency ratios of the journals cited by Cell are computed and taken as probabilities of their relevance to *Cell*.

Step 3: On the basis of the relevance probabilities computed in step 2 an ordered set of relevant journals of quality can be generated from the starting journal by lowering the threshold value until new journals are introduced. Table 3 shows the order in which the cell biology list was generated, the threshold at which each journal entered the list and the journal that cited it.

Figure 6:
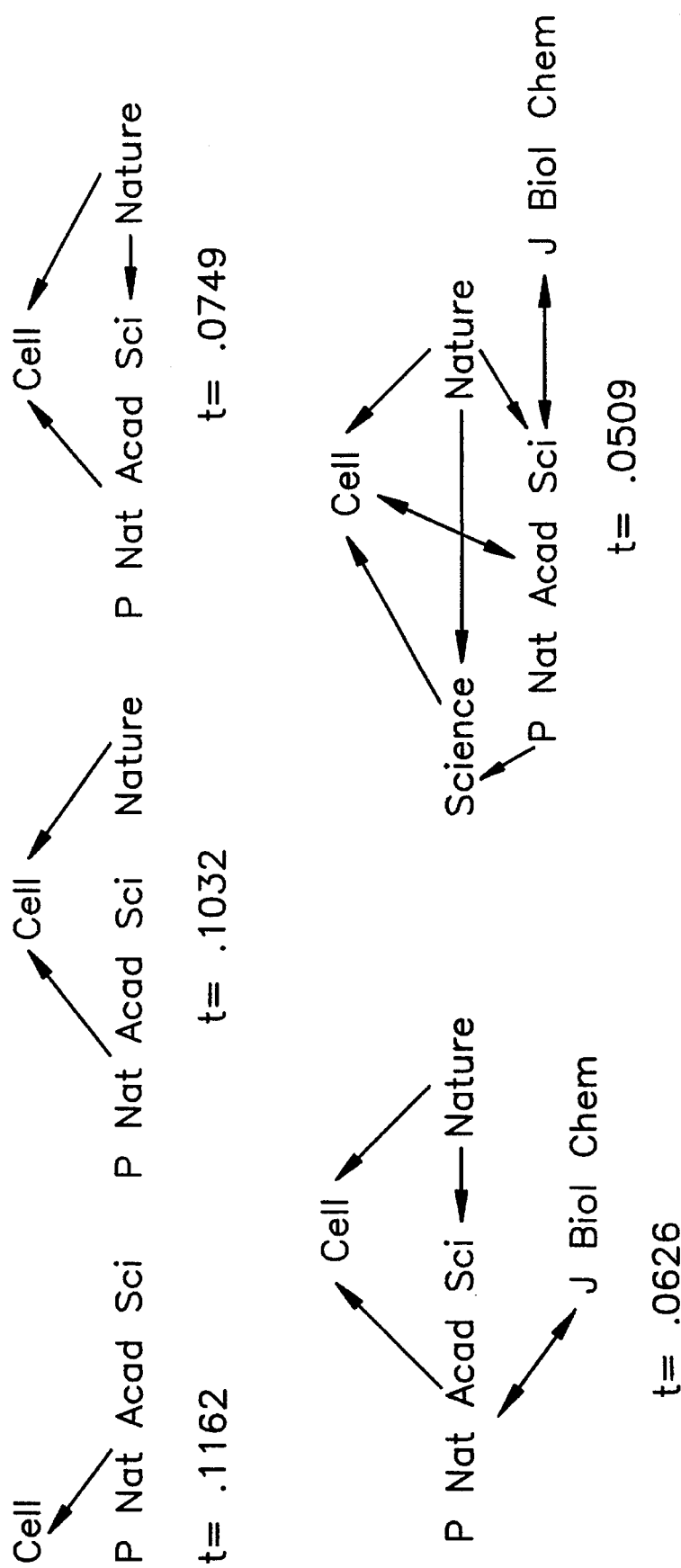
FIG. 6 illustrates relevance digraphs for a second example of journal selection for the field of cell biology.
Figure 7:
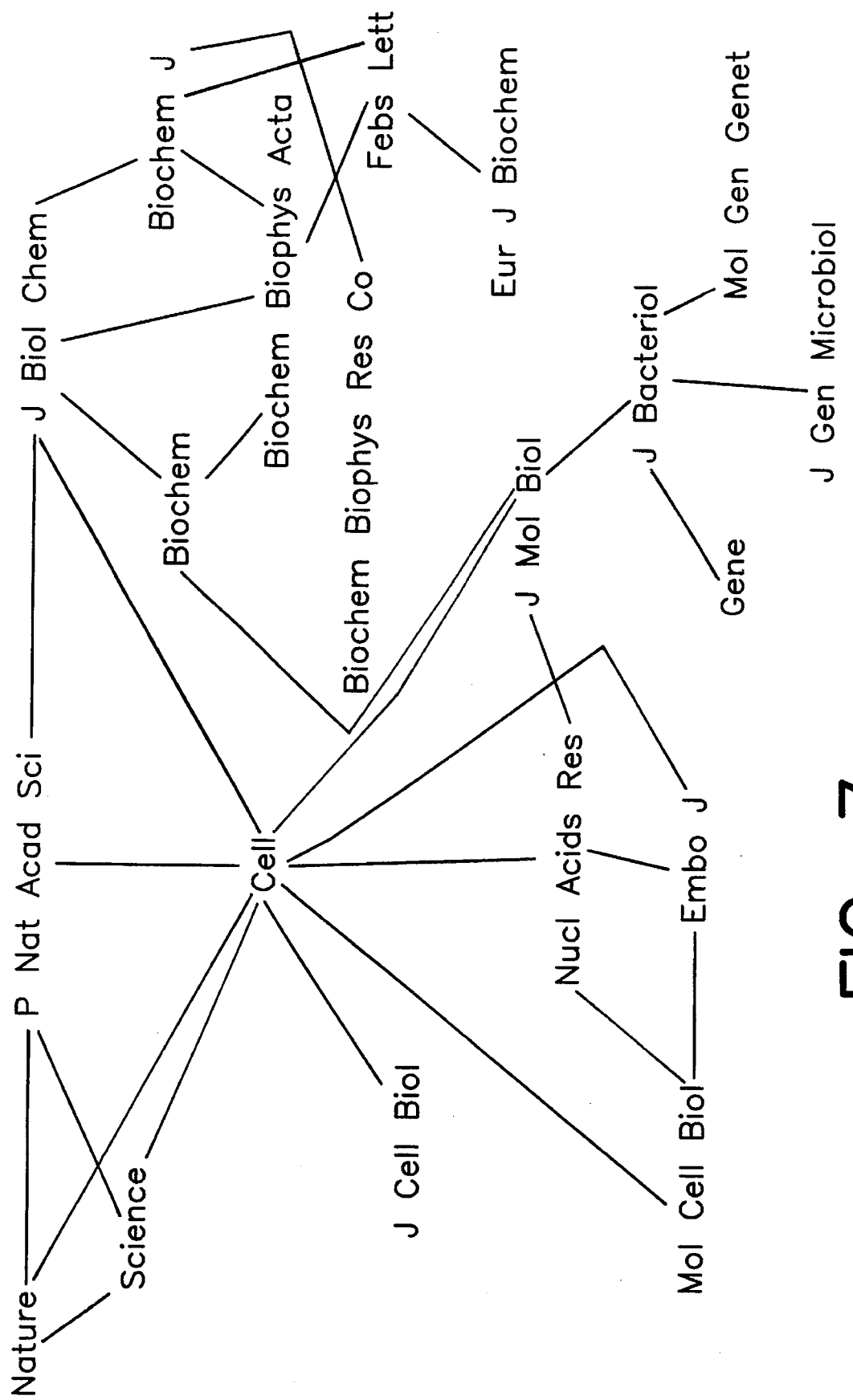
FIG. 7 illustrates the bi-communication graph and selection of the threshold value for the second example of FIG. 6.

FIG. 6 shows the digraphs of these journals at thresholds greater than 0.0500. As the threshold continues to descend to 0.0240, the structure enfolds into a bi-communication graph consisting of two blocks (non-separable subgraphs), shown in FIG. 7. At this level the cell biology block merges with the bacteriology block. Hence 0.0240 constitutes the first cutoff point for cell biology and a collection of 16 journals for that field is defined. Since the biochemistry and interdisciplinary journals were not separable from the cell biology journals as the threshold decreased, they are included in the cell biology list.

Figure 8:
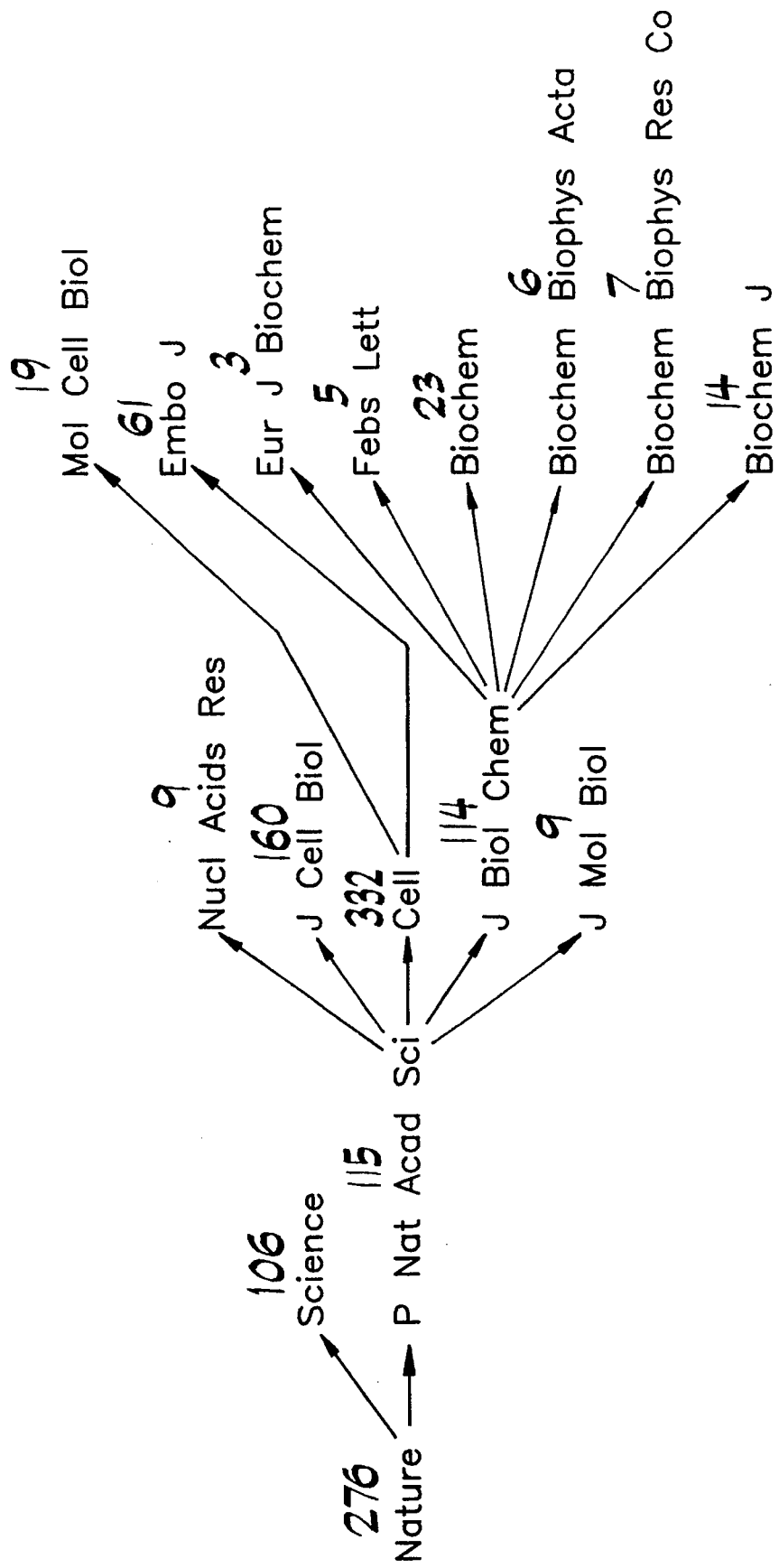
FIG. 8 illustrates the dominance tree for the second example of FIG. 6.

Step 4: FIG. 8 shows the dominant journal tree for the cell biology collection where the number above each title relates to the following subjective rating system against which the present invention is verified. *Current Opinion in Cell Biology* is one of a number of periodicals on various scientific subjects published every two months in a series called Current Biology. Each issue has a section named Bibliography of the Current World Literature. This bibliography is compiled by cell biologists from a list of a hundred or more journals selected over the years. In addition, the reviewers rate the papers which are considered of outstanding interest (denoted with a "double dot"). For the year 1990, 257 primary journals were scanned listing 45,268 relevant papers of which 1,526 were given double dots. These 1,526 were the quality papers in this field, and therefore a good measure of the present method's efficacy. The number above the journal titles in FIG. 8 stands for the number of double dot papers published in that journal in 1990.

Step 5: As shown in FIG. 8, the root and branch point journals were *Nature, Proceedings of the National Academy of Science, Journal of Biological Chemistry* and *Cell* which were four of the top five journals in the subjective rating by the cell biologists. Moreover, FIGS. 7 and 8 and table 4 show that the starting journal *Cell* accounted for 22% of the double dot papers, the nine journals of distance 1 from *Cell* an additional 57%, those of distance 2 an additional 3%, and those of distances 3 and 4 only 1%. Thus, the further the distance from the starter journal *Cell* the less the relevance and quality. The method in this case proved to be 83% effective with a collection of 16 journals or 6% of those actually scanned, 55% effective with only 4 journals (the root and branch points) or less than 2% of those scanned. Furthermore, the 16 journals ranked highest by the reviewers had 1,314 double dot papers which was 86% of the total. The use of this method selected a list of 16 high relevance, high quality journals accounting for 1,260 double dot papers, which was 96% of the totals for the 16 top journals subjectively selected by reviewers in this field. Although it is well known that a few journals will account for most of the quality papers, these journals could only be identified a posteriori, i.e., after the experts had scanned all 257 journals. On the other hand, the method of the present invention can produce its list a priori, and in a very short time at very little cost.

EXAMPLE III

In this example, a more general library of science journals focusing on the fields of marine biology and oceanography was selected and tested against a use study of the Marine Biological Laboratory (MBL) library at Woods Hole, Mass., conducted in 1983 with the support of the Rockefeller Foundation. Since the MBL study was carried out in 1983, the 1981 JCR was used to test the present method.

Step 1: The most cited marine biology journal in the 1981 JCR was the journal *Marine Biology*.

Step 2: The relevance probabilities of journals cited by the starter journal were computed as in the previous examples.

Step 3: The threshold must be set at a low enough level to encompass those subjects areas relevant to marine biology. As the threshold decreases towards 0, various journals form bi-communication classes representing the various subject areas which then merge with each other sequentially. These will be relevant to the marine biology class at different levels. Consequently, a sequence of subjects areas (bi-communication classes) can be identified and ordered according to their relevance to the marine biology class and represented by a condensation graph. The journals within each class can themselves be ordered by the method described with respect to table 3 in example II.

Figure 9:
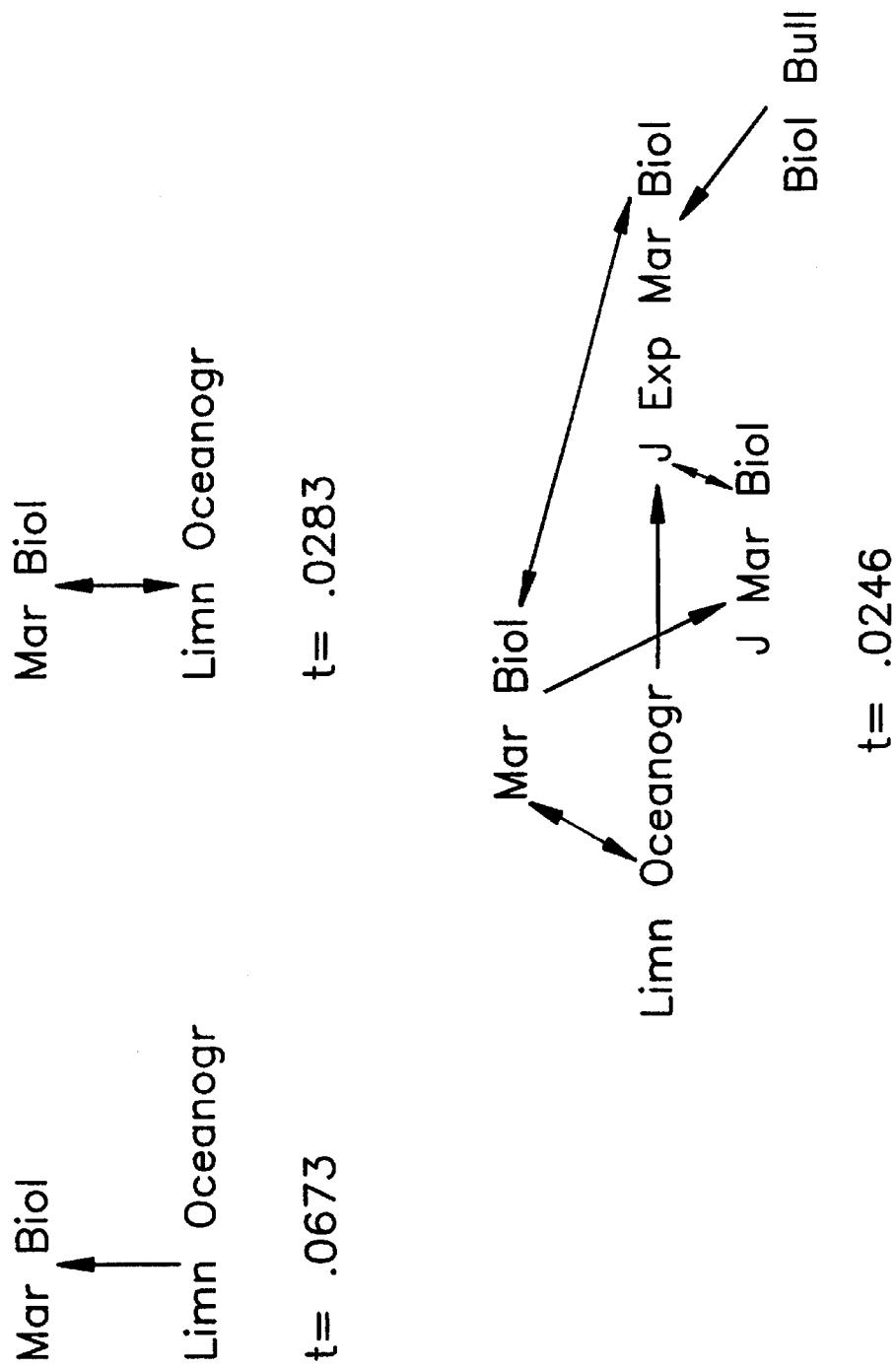
FIG. 9 illustrates relevance digraphs for a third example of journal selection for the field of marine biology.
Figure 10:
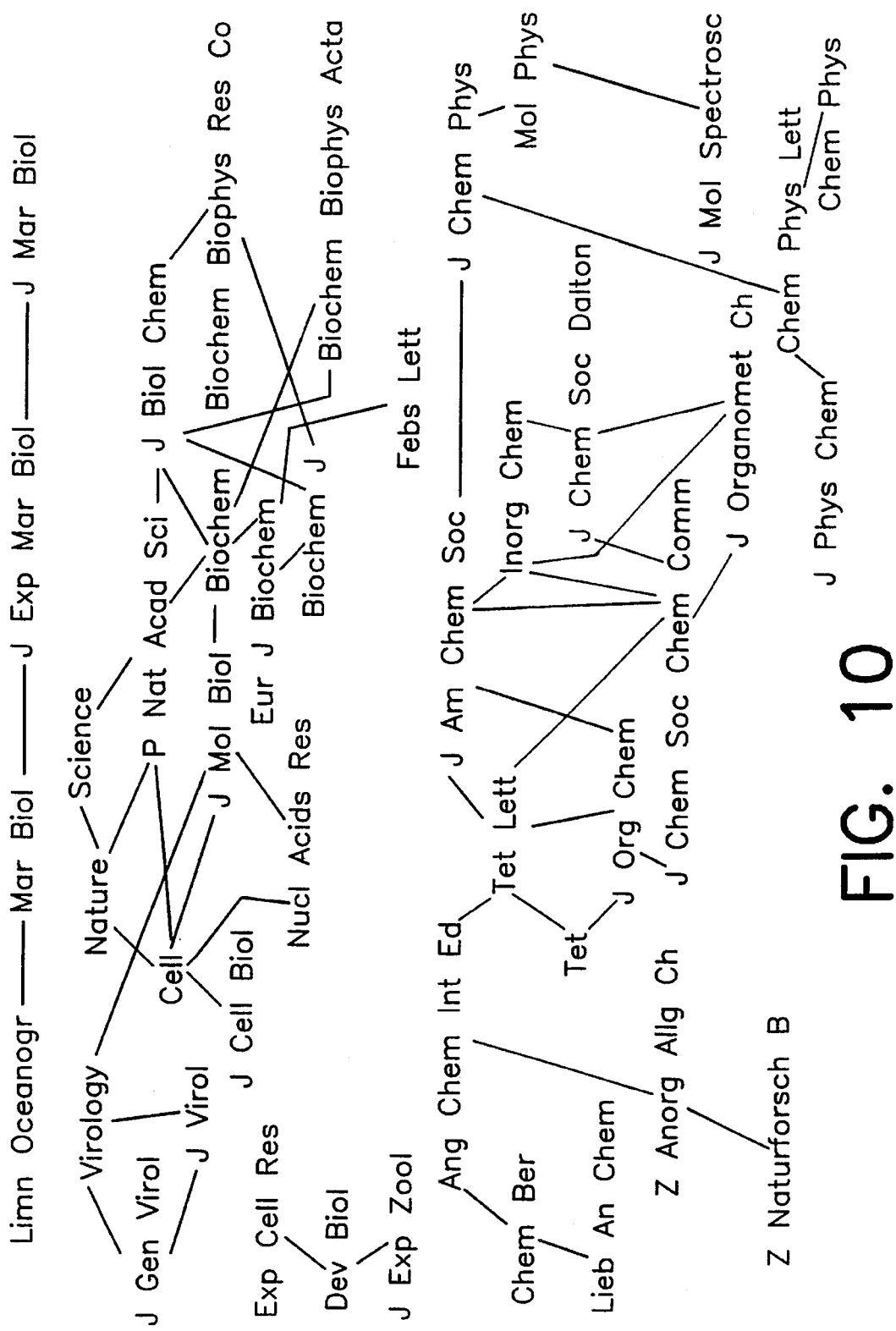
FIG. 10 illustrates the bi-communication graph for the third example of FIG. 9.
Figure 11:
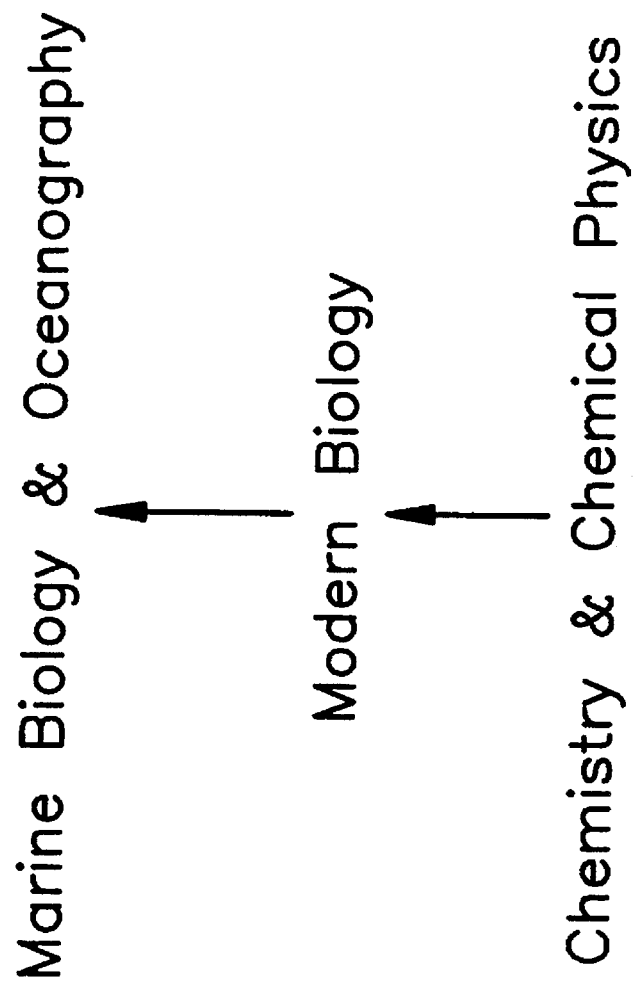
FIG. 11 illustrates the condensation graph for the third example of FIG. 9.

FIG. 9 shows digraphs for marine biology journals at thresholds greater than 0.0246. FIG. 10 shows the formation of bi-communication classes of journals generated from the starting journal at a threshold value of 0.0228, and FIG. 11 shows the condensation graph of the classes in FIG. 10. An ordering of journals generated from the journal *Marine Biology* at threshold 0.0228 both by class and within class is shown in table 5.

Figure 12:
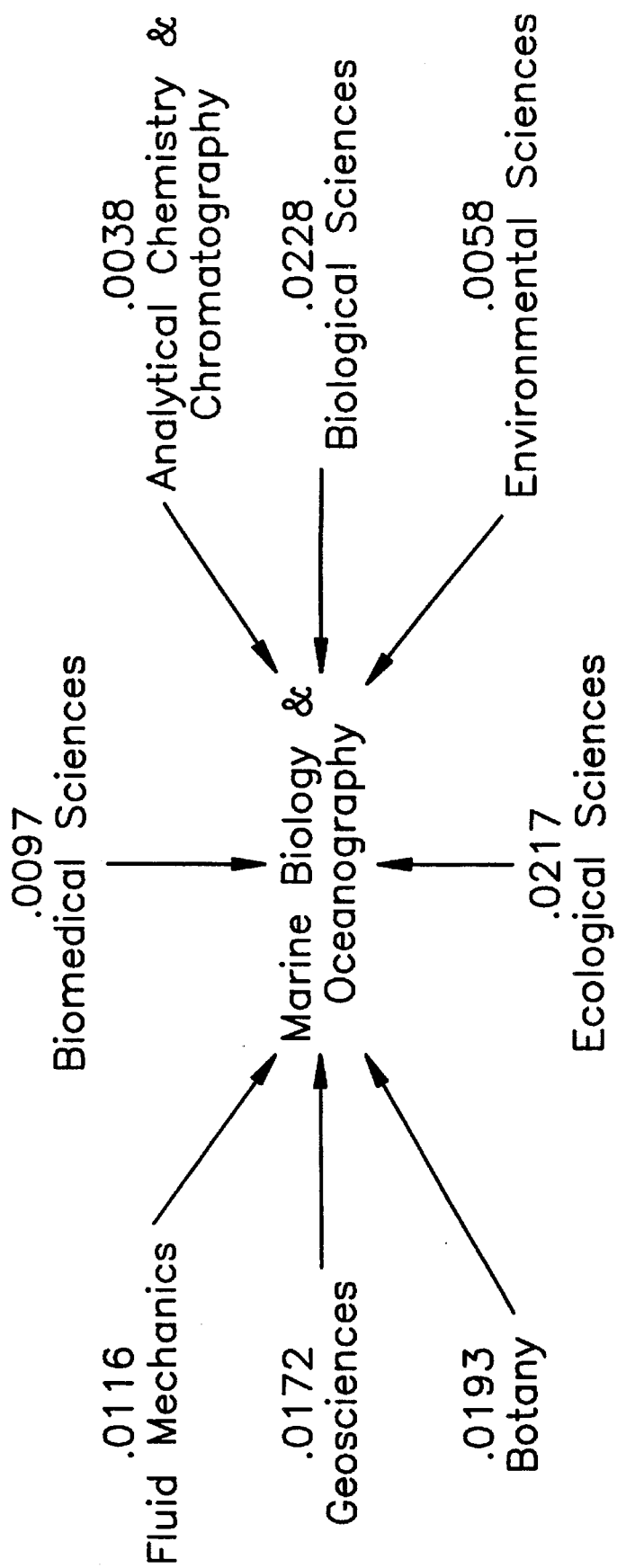
FIG. 12 illustrates a condensation subgraph for the third example of FIG. 9.

FIG. 12 shows those subjects (bi-communication classes) that are at quasi-distance one from the marine biology class, as the threshold approaches 0. The directed arrow and the number associated with each class designates the highest probability at which a journal in the marine biology class cited a journal in the given class, and thereby indicates the order of threshold values, hence the sequence of relevance, both by class and within class. Thus, a collection of journals of any size ordered on the basis of their relevance probabilities can be generated from the starting journal on the basis of natural cutoff points. Since a collection of 450 journals accounted for 75% of all uses in the MBL study, an ordered set of 450 journals was generated from the journal *Marine Biology* from the 1981 JCR.

Step 4: Trees of dominant journals are constructed from the collection generated in step 3 by the process described in the previous examples.

Step 5: The root and branch point journals in the trees of dominant journals are identified.

The selection and ordering of journals for relevance by the above method is compared to the MBL use study. The MBL Library is of international stature and very heavily used. Its collection is broadly interdisciplinary, reflecting the interests of a diverse usership. It is thus a comprehensive library for all sciences relevant to research in marine biology and oceanography. For the period surveyed (Mar. 1 to Dec. 31 of 1983) the MBL journal collection consisted of 4,765 titles, of which 2,437 were active, i.e., under current subscription.

MBL frequency of use data were obtained as follows: (1) for recent and unbound issues, readers were asked to make an appropriate check mark on an attached survey slip, which were recorded by the staff; (2) for bound volumes, readers were asked not to reshelve after consultations, reshelving was done by the staff and each volume was logged; and (3) incoming requests for interlibrary loans were logged. Cooperation within the user community appeared to be universal. After eliminating the use of secondary sources, total usage of the collection was tallied at 101,746. Half of all uses were covered by about 150 journals, two thirds by 300 and three fourths by 450 titles.

Tables 6 and 7 show the comparison of results produced by the present method with the MBL study data. The present method in this example produced collections of 100, 200, 300, 400 and 450 journals which performed at 86% to 91% efficiency compared to the MBL study, and the set of root and branch point journals performed at 85% efficiency. Of those journals used 100 or more times as identified in the MBL study, the present method yielded 94% of the journals in its collection, and 52% of those were root or branch point journals. Moreover, 92% of the journals used 500 or more times were root or branch point journals as were 65% of those used 200 or more times.

Again the efficacy of the present method is clearly demonstrated. Whereas the MBL study took 10 months to perform and cost in the range of $20,000 in 1983 dollars, application of this method would have cost a little over 1% of that sum and taken less than 1% of the time of the MBL study. Moreover, detecting any changes in the use patterns of journals would require repeating the laborious and costly process of a use study, whereas the present method can simply be applied to citation data annually for this purpose.

With reference to FIG. 1a, the method of the present invention as applied to the problem of retrieving relevant scientific papers of quality from an overall source of scientific literature proceeds by the following steps:

Step 1: Identify a relevant paper of quality which corresponds to the query or starting object in the retrieval process. Denote this paper by $P_0$. In most retrieval situations the inquirer already knows of such papers.

Step 2: Identify all papers citing or cited by $P_0$ from the Science Citation Index published annually by the Institute for Scientific Information. These papers are those most relevant to $P_0$ and are called the pragmatic descriptors of $P_0$. Identify the pragmatic descriptors for each of these papers. Compute the probability that each of these papers is relevant to $P_0$ in accordance with the following definition. The number of common descriptors of papers $P_i$ and $P_j$ divided by the total number of descriptors associated with $P_i$ is taken as the probability that $P_j$ is relevant to $P_i$. On the other hand, the number of common descriptors divided by the total number of descriptors associated with $P_j$ is taken as the probability that $P_i$ is relevant to $P_j$. Select the paper with the highest probability of relevance to $P_0$ and denote it as $P_1$. Repeat this process until no new papers are identified.

Step 3: Construct relevance digraphs of papers on the basis of the probabilities computed in step 2 at an appropriate threshold t.

Step 4: Construct a dominance tree of papers based on the relevance probabilities computed in step 2.

Step 5: Identify root and branch point papers of the dominance tree.

Example IV deals with the application of the method to the retrieval of papers from journals and is tested against the MEDLARS system, the computerized information retrieval system of the National Library of Medicine, which utilizes the conventional Boolean strategy.

EXAMPLE IV

This example is based on an actual problem that arose in the field of medicine. A pediatrician whose specialty was child development and a hematologist involved in the study of iron deficiency learned that iron deficiency may adversely affect development during childhood and adolescence at a 1975 lecture by one of America's foremost pediatric hematologists. To pursue the issue, a MEDLARS search was made for papers indexed under "iron deficiency" and "child behavior". MEDLARS like most operating information retrieval systems is based on the Boolean strategy for establishing relevance. As a result of the Boolean MEDLARS search, 36 references were identified, but none was judged useful when read.

One might conclude from the result of the Boolean MEDLARS search that little if any information existed in this area. By chance, however, later correspondence in the *Journal of Pediatrics* identified 32 other references relating to the subject. Also, a commissioned review paper appeared with 81 references. Thus, a substantial literature on the subject was shown to exist. The two investigators evaluated the 81 references in the review article and identified 25 as particularly significant. After conferring again with medical librarians, a further MEDLARS search using 20 medical subject headings (MESH) in various Boolean statements as queries produced a set of 133 references as output, only 2 of which were cited by the commissioned review paper. This search covered the period 1969–1975 since that was the time period covered by the MEDLARS file. The 81 references in the review paper contained 51 journal articles, the others being monographs, theses and government reports. Of the 51 journal articles, 33 were published between 1969 and 1975 and included 14 of the highly significant papers selected by the two investigators. The MEDLARS file contained 30 of the 33 relevant papers including 12 of the highly significant ones, hence its coverage of the field was excellent.

An experiment using the above problem as a test of the efficacy of the present method for information retrieval was conducted. This experiment attempted to answer the following three questions.

1. If restricted to papers contained in the MEDLARS file (1969–1975), could the 30 articles cited in the review article be retrieved by the present method with a reasonably high precision?

2. Could all 81 references of the review article be retrieved with a reasonably high precision?

3. How many of these articles would have been retrieved had the search been restricted to a small core collection of journals selected by the present method as applied to journal retrieval?

Step 1: The correspondence in the *Journal of Pediatrics* that first indicated that an active literature in this interdisciplinary area existed is taken as the starter paper $P_0$. This correspondence was not cited by nor did it cite the review article.

Step 2: From the Science Citation Index 32 pragmatic descriptors of $P_0$ were identified. Of these 17 were journal articles published between 1969–1975. From the Science Citation Index, the pragmatic descriptors of each of the 32 documents cited by or citing $P_0$ were identified. On the basis of these data the relevance probabilities of these 32 articles to $P_0$ were computed. The one with the highest probability of relevance to $P_0$ was identified and denoted by $P_1$. Repeating this process until no new documents were identified resulted in a set of 135 unique documents, namely $P_0$, all of its pragmatic descriptors, all of the pragmatic descriptors of $P_1$, and so forth. Those documents of quality most relevant to $P_0$ should be included in this set. Of these 135 documents, 67 were journal articles in the MEDLARS file of 1969–1975. The relevance probabilities for each pair of the 135 documents were computed.

Step 3: At threshold 0 construct a relevance digraph on the basis of the relevance probabilities computed in step 2 and partition it into its bi-communication classes. The class containing the starter paper (query) $P_0$ was identified, consisting of 119 documents of which 56 were journal articles published in 1969–1975 and were included in the MEDLARS file. Arbitrarily raising the threshold to 0.1000 reduced the bi-communication class containing $P_0$ to 36 papers in the MEDLARS file. Raising the threshold to 0.1400 resulted in a bi-communication class of 12 papers. The latter was the highest threshold possible since that was the relevance level above which the starting paper representing the query was separated from the bi-communication class thus becomming an isolated point.

The conventional way of evaluating an information retrieval system is by recall and precision. Recall is the ratio of relevant items retrieved to the total number of relevant items in the file. Precision is the ratio of the number of relevant items retrieved to the total number of items retrieved. Thus recall measures the effectiveness of the system and precision its efficiency.

Table 8 compares the performance of the present method with the conventional Boolean approach and table 9 shows the performance of the present method when the digraph was not restricted to the journal articles in the MEDLARS file. Table 10 shows the method's performance when the number of journals searched is limited to a set of selected journals as described in example II. For this purpose, the 1975 JCR data was used, the starting journal being the *Journal of Pediatrics* and the cutoff threshold being 0.0093 at which point the block of pediatric journals merged with that of general medicine. The selected set consisted of five journals, and 37 or two-thirds of the papers retrieved as relevant at threshold 0 appeared in the five selected journals. These journals contained half of those retrieved at the maximal threshold of 0.1400. Moreover, the 6 papers retrieved at that level constituted half of the most significant papers selected by the two investigators that were in the MEDLARS file.

Step 4: Construct the dominance tree of papers.

Step 5: Identify the root and branch point papers. At threshold 0, the class of papers containing the starter paper $P_0$ included 63 root and branch point papers. Thirteen were among the 25 significant papers identified by the two investigators, an additional 39 or a total of 52 were referenced by the review article and only 11 were not relevant. Thus about two thirds of 81 references were roots or branch points.

These results clearly show that the present non-Boolean method performed significantly better than the conventional Boolean approach in terms of both recall and precision. As recall increases, precision decreases and vice versa. In this method, the higher the threshold the lower the recall and the greater the precision. Thus, if recall is paramount to the user's needs, the threshold should be set at 0. If precision is paramount, the threshold should be set at the maximal level.

These examples indicate that the invention is an effective and efficient tool for information retrieval that performs significantly better than the conventional approaches to either selecting scientific journal collections or retrieving scientific papers.

Since the present method uses quantitative procedures, it can be readily automated in a computer system. For example, in the case of journal selection, the list of source journal names and journal citation data can be maintained as a database, and the procedural steps of the method can be carried out by a computer program for calculating relevance probabilities from the citation data, selecting sets of journals for an indicated range of thresholds values, ordering the selected journals, determining dominance relations of the journals from the relevance probabilities, and identifying root and branch points. Conventional computer graphing techniques can be used to generate visual displays or printed outputs of relevance digraphs, strong components and condensation graphs.

Figures 1, 1B:
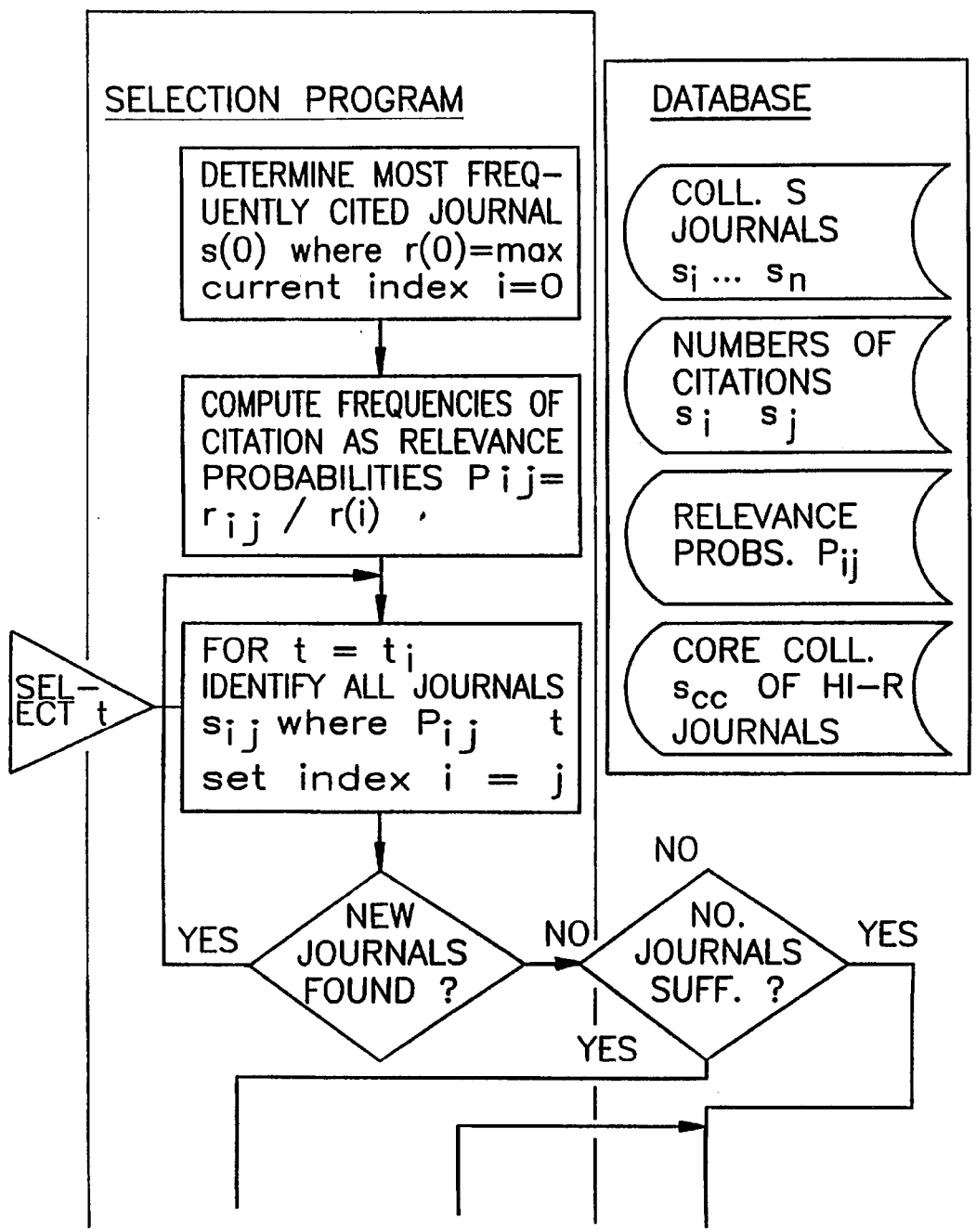
Figures 1, 1B, 2:
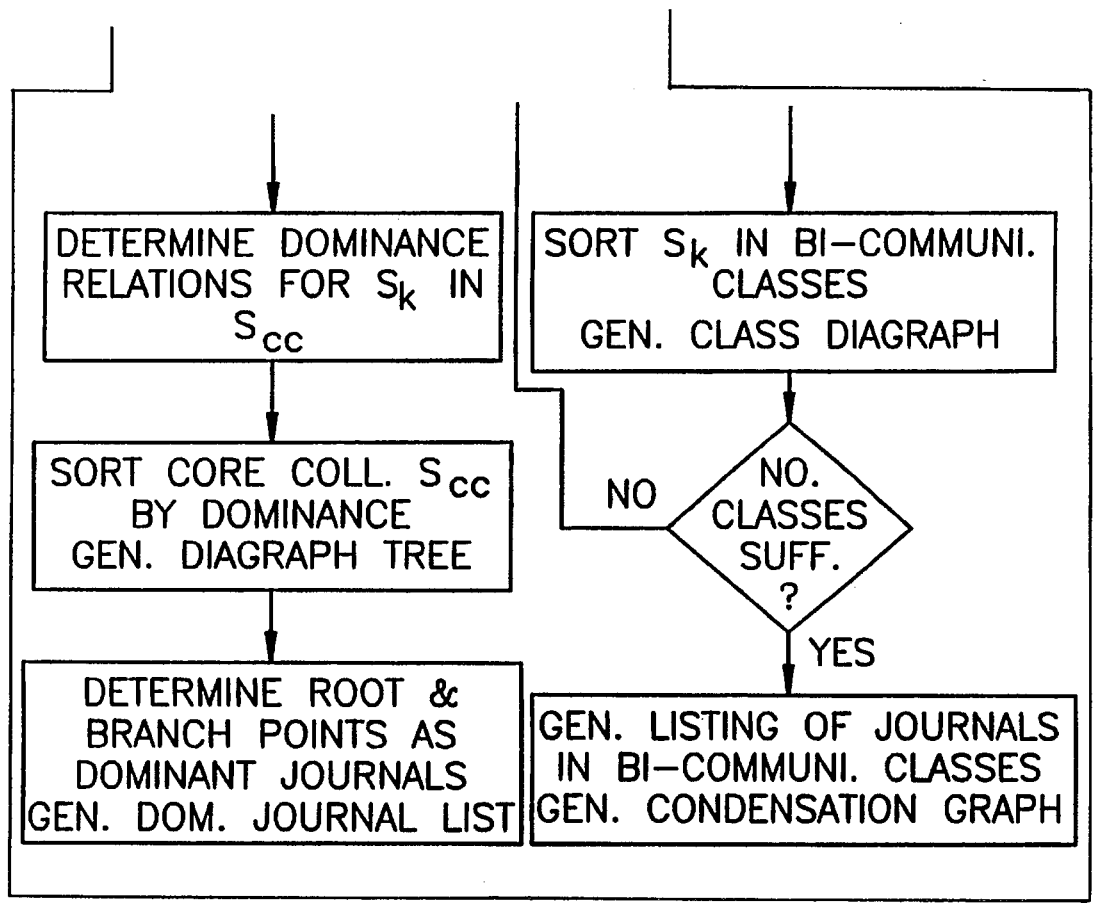
FIG. 2 illustrates a bi-communication graph in a first example of applying the invention to the selection of core journals from an overall source collection.
Figure 2:
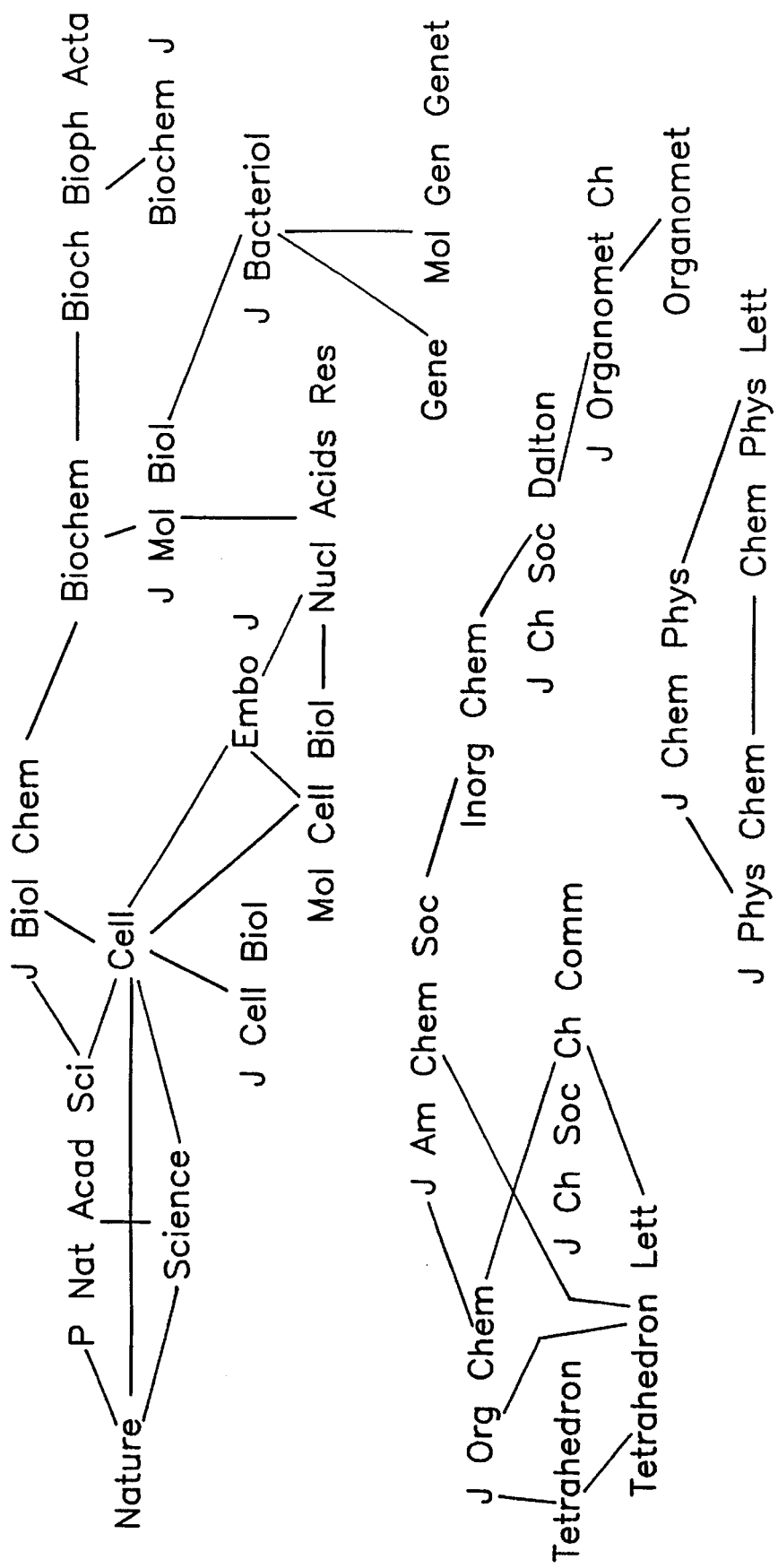

Referring to FIG. 1b, an example of a data flow sequence for a computer system implementation of the journal selection application of this method is illustrated. The system includes a computer program 30 for performing the computational, sorting and ordering functions of the journal selection application and a database 40. The database includes initial data of the overall collection S of journal names $s_1, \ldots, s_n$ and a listing of the numbers of citations $r_{ij}$ of each journal $s_i$ of the other journals $s_j$. At block 31 of the program, the most frequently cited journal $s_0$ is identified as the starter journal. At block 32, the relevance probabilities $P_{ij}$ are computed as ratios of the frequencies of citation. At blocks 33 and 34, a threshold value t is selected, and all journals cited by the starter journal $s_0$ having relevance probabilities greater than the threshold are identified, and the loop repeated for the newly found journals $s_i$ until no new journals are identified. The process may be repeated for other threshold values by the test at block 35 for a sufficient number of journals identified. The resulting set of relevant journals contains the core collection $S_{cc}$ of high relevance, high quality journals at the selected threshold. At blocks 36, 37 and 38, the dominance relations are determined, a dominance tree is generated and the dominant journals identified. These constitute the core collection $S_{cc}$. At blocks 39, 40 and 41 the generated collection is sorted into bi-communication classes and a condensation graph of these classes ordered for relevance to the class containing the starter journal. This set of journals constitutes the comprehensive collection.

Thus, different selection objectives can be achieved. If what is needed is a very small set of journals of the highest relevance and quality, the core collection of dominant journals will provide such a set. If what is needed is a denser and broader coverage, the comprehensive collection of bi-communication classes ordered by relevance to and distance from the focal class on the basis of natural cutoff thresholds will provide such a collection. Further adjustments in the size of both the core and comprehensive sets can be achieved by varying the threshold values.

Similar computer systems can be described for the retrieval of scientific papers or any other specific application of the invention.

The principles of the invention may be broadly applied to other types of high relevance selection or information retrieval problems. The elemental datum used in this objective method is a directed conversation or communication between two objects in a source collection. Although the above examples relate to journal or document citation as the elemental datum and journal or document titles as the source collection, the present method may be applied equivalently to other types of directed communications and sources. All that is needed are operational definitions of the source objects, their directed relations and their relevance probabilities. For example, the user names of a network may be taken as the source collection, the elemental datum may be the sending of a message or work product from one station to another, the frequency measures of which define the relevance probabilities, and the selection and ordering procedures may be used to identify code nodes, communicators or workers. On the other hand, the method could be applied in defining communication patterns among a variety of sets of objects such as defining preformed ontogenetic patterns. These are patterns with topologies that have been conserved during their ontogenies. In such an application, an organism is represented by a communication digraph with cells being points of the graph and lines a measure of their linkages. The families of digraphs generated by variation of the threshold represent the development of an organism from a single cell.

Although the invention has been described with reference to certain examples, it will be appreciated that many other variations and modifications thereof may be devised in accordance with the principles disclosed herein. The invention including the described examples and all variations and modifications thereof within the scope and spirit of the invention, is defined in the following claims.

TABLE 1

Example of Citation Data from 1990 JCR
Citing Journal Listing

| Citing Journal<br>Cited Journal | Total |
|---|---|
| J Biol Chem | 133458 |
| J Biol Chem | 26063 |

TABLE 1-continued

Example of Citation Data from 1990 JCR
Citing Journal Listing

| Citing Journal<br>Cited Journal | Total |
|---|---|
| P Nat Acad Sci | 11081 |
| Nature | 6051 |
| Biochemistry | 5765 |
| . | |
| . | |
| . | |
| Eur J Immunol | 89 |
| All Others(4050) | 19998 |

TABLE 2

Journals Selected from the Journal of Biological Chemistry
at Thresholds Greater than .0285
Added Journals

| Thresholds | Starter<br>J Biol<br>Chem | .0830<br>P Nat<br>Acad Sci | .0707<br>Nature | .0557<br>Cell | .0505<br>Science | .0486<br>Embo<br>J |
|---|---|---|---|---|---|---|
| Thresholds | .0431<br>Biochem<br>Biochim Biophys<br>Acta | | .0412<br>Nucl<br>Acids Res | | .0397<br>J Mol<br>Biol | .0391<br>Mol Cell<br>Biol |
| Thresholds | .0296<br>J Bacteriol<br>Gene<br>Mol Gen Genet | | .0285<br>J Am Chem Soc<br>Biochem J<br>J Org Chem<br>Tetrahedron Lett<br>J Chem Phys<br>Inorg Chem<br>Biochem Biophys Res Co<br>Tetrahedron<br>J Chem Soc Chem Comm<br>Chem Phys Lett<br>J Phys Chem<br>J Chem Soc Dalton<br>Ang Chem Int Ed<br>J Organomet Ch<br>Organomet | | | |

TABLE 3

Ordering of Cell Biology Journals on the Basis
of Relevance to the Starting Journal

| Journal Ranking | Citing Journal | Threshold |
|---|---|---|
| 1. Cell | Starting Journal | |
| 2. P Nat Acad Sci | Cell | .1162 |
| 3. Nature | Cell | .1032 |
| 4. J Biol Chem | P Nat Acad Sci | .0626 |
| 5. Science | Cell | .0509 |
| 6. Biochem | J Biol Chem | .0427 |
| 7. Biochim Biophys Acta | Biochem | .0427 |
| 8. Embo J | Cell | .0424 |
| 9. Nucl Acids Res | Embo J | .0424 |
| 10. J Mol Biol | Nuc Acids Res | .0424 |
| 11. Mol Cell Biol | Cell | .0351 |
| 12. Biochem J | Biochim Biophys Acta | .0271 |
| 13. Biochem Biophys Res Co | Biochem J | .0271 |
| 14. Febs Lett | Biochem J | .0262 |
| 15. Eur J Biochem | Febs Lett | .0262 |
| 16. J Cell Biol | Cell | .0244 |

TABLE 4

Distribution of Double Dot Papers among Journals by Distance from Starting Journal

| Journal | Distance from Starting Journal | No. of Double Dot Papers | Cumulative Total & Percentage |
|---|---|---|---|
| Cell | 0 | 332 | 332(22%) |
| P Nat Acad Sci | 1 | 115 | 447(29%) |
| Nature | 1 | 276 | 723(47%) |
| J Biol Chem | 1 | 114 | 837(55%) |
| Science | 1 | 106 | 943(69%) |
| Embo J | 1 | 61 | 1,004(66%) |
| Nucl Acids Res | 1 | 10 | 1,014(66%) |
| J Mol Biol | 1 | 9 | 1,023(67%) |
| Mol Cell Biol | 1 | 19 | 1,042(68%) |
| J Cell Biol | 1 | 160 | 1,202(79%) |
| Biochem | 2 | 23 | 1,225(80%) |
| Biochim Biophys Acta | 2 | 6 | 1,231(81%) |
| Biochem J | 2 | 14 | 1,245(82%) |
| Biochem Biophys Res Co | 3 | 7 | 1,252(82%) |
| Febs Lett | 3 | 5 | 1,257(82%) |
| Eur J Biochem | 4 | 3 | 1,260(83%) |

TABLE 5

List of Journals Generated from the Journal MARINE BIOLOGY. Ordered by Class & within Class at Threshold .0228

| Class | Journal | Citing Journal | Threshold |
|---|---|---|---|
| 1. Marine Biology & Oceanography | 1. Mar Biol | Starting | |
| | 2. Limn Oceanogr | Mar Biol | .0673 |
| | 3. J Exp Mar Biol | Mar Biol | .0246 |
| | 4. J Mar Biol | J Exp Mar Biol | .0246 |
| 2. Biological Sciences | 5. Science | Limn Oceanogr | .0228 |
| | 6. Nature | Science | .0228 |
| | 7. P Nat Acad Sci | Science | .0228 |
| | 8. Cell | Nature | .0228 |
| | 9. J Biol Chem | P Nat Acad Sci | .0228 |
| | 10. J Mol Biol | P Nat Acad Sci | .0228 |
| | 11. Biochem | P Nat Acad Sci | .0228 |
| | 12. J Virol | Cell | .0228 |
| | 13. Nucl Acids Res | Cell | .0228 |
| | 14. J Cell Biol | Cell | .0228 |
| | 15. Biochim Biophys A | J Biol Chem | .0228 |
| | 16. Biochem Biophys R | J Biol Chem | .0228 |
| | 17. Biochem J | J Biol Chem | .0228 |
| | 18. Eur J Biochem | J Biol Chem | .0228 |
| | 19. Virology | J Mol Biol | .0228 |
| | 20. J Gen Virol | J Virol | .0228 |
| 2. Biological Sciences | 21. Exp Cell Res | J Cell Biol | .0228 |
| | 22. Febs Lett | Biochim Biophys Acta | .0228 |
| | 23. Dev Biol | Exp cell Res | .0228 |
| | 24. J Exp Zool | Dev Biol | .0228 |
| 3. Chemistry & Chemical Physics | 25. J Am Chem Soc | Biochem | .0228 |
| | 26. J Org Chem | J Am Chem Soc | .0228 |
| | 27. Tet Lett | J Am Chem Soc | .0228 |
| | 28. J Chem Phys | J Am Chem Soc | .0228 |
| | 29. Inorg Chem | J Am Chem Soc | .0228 |
| | 30. J Ch Soc Ch Co | J Am Chem Soc | .0228 |
| | 31. Tet | J Org Chem | .0228 |
| | 32. Ang Ch Int Ed | Tet Lett | .0228 |
| | 33. Chem Phys Lett | J Chem Phys | .0228 |
| | 34. Mol Phys | J Chem Phys | .0228 |
| | 35. J Organomet Ch | Inorg Chem | .0228 |
| | 36. J Ch Soc Dalton | Inorg Chem | .0228 |
| | 37. J Ch Soc Perk $T_1$ | J Ch Soc Ch Co | .0228 |
| | 38. Chem Ber | Ang Ch Int Ed | .0228 |
| | 39. Z Anorg Allg Ch | Ang Ch Int Ed | .0228 |
| | 40. Chem Phys | Chem Phys Lett | .0228 |
| | 41. J Phys Chem | Chem Phys Lett | .0228 |
| | 42. J Mol Spectrosc | Mol Phys | .0228 |
| 3. Chemistry & Chemical Physics | 43. Lieb Ann Chem | Chem Ber | .0228 |
| | 44. Z Naturforsch B | Z Anorg Allg Ch | .0228 |

TABLE 6

Comparison of Collections Selected by the Proposed Method with MBL Use Study

| No. of Journals | Usage in MBL Study | % of Total Usage | Usage of Selected List | % of Total Usage | Efficiency of Selected List |
|---|---|---|---|---|---|
| 100 | 45,283 | 45% | 38,823 | 38% | 86% |
| 200 | 58,732 | 58% | 54,591 | 54% | 91% |
| 300 | 67,444 | 66% | 62,034 | 61% | 90% |
| 400 | 73,872 | 73% | 68,187 | 67% | 91% |
| 450 | 76,410 | 75% | 69,293 | 68% | 91% |
| No. of Root & Branch Point Journal in Selected List of 450 Journals | | No. of Uses of 123 Root & Branch Point Journals | | No. of Uses of 123 most Used Journals in MBL Study | Efficiency of Root & Branch Point Journals |
| 123 | | 41,366 | | 48,598 | 85% |

TABLE 7

Comparison of Journals Selected by Proposed Method with Most Frequently used Journals in the MBL Study

| Frequency of Use | No. of Journals in MBL Study | No. of Uses | % of Use | No. of Journals in Selected List | No. of Root & Branch Point Journals |
|---|---|---|---|---|---|
| Over 1,000 | 8 | 13,274 | 13% | 8(100%) | 8(100%) |
| Over 500 | 24 | 24,235 | 24% | 24(100%) | 22(92%) |
| Over 400 | 36 | 29,022 | 29% | 36(100%) | 31(86%) |
| Over 300 | 53 | 35,033 | 34% | 53(100%) | 40(75%) |
| Over 200 | 96 | 45,281 | 45% | 93(97%) | 62(65%) |
| Over 100 | 229 | 63,004 | 62% | 215(94%) | 118(52%) |

TABLE 8

Comparison of the Proposed Method with the Boolean Approach for the Retrieval of Scientific Papers

| Method | 30 Articles in MEDLARS File Cited by Review Article | | 12 Articles in MEDLARS File Selected by Subject Experts | |
|---|---|---|---|---|
| | Recall | Precision | Recall | Precision |
| Boolean(MEDLARS) | 2/30 = .0666 | 2/133 = .0150 | 2/12 = .1666 | 2/133 = .0150 |
| Proposed Non Boolean | | | | |
| $t = .0000$ | 30/30 = 1.000 | 30/56 = .5357 | 12/12 = 1.0000 | 12/56 = .2142 |
| $t = .1000$ | 22/30 = .7333 | 22/36 = .6111 | 10/12 = .8333 | 10/36 = .2777 |
| $t = .1400$ | 12/30 = .4000 | 12/12 = 1.000 | 9/12 = .7500 | 9/12 = .7500 |

TABLE 9

Performance of Proposed Method for Retrieving the Total Literature

| | 81 References Cited by the Review Article | | 25 References Selected by Subject Specialists | |
|---|---|---|---|---|
| | Recall | Precision | Recall | Precision |
| $t = .0000$ | 76/81 = .9382 | 76/119 = .6386 | 25/25 = 1.0000 | 25/119 = .2100 |
| $t = .1000$ | 55/81 = .6790 | 55/73 = .7534 | 20/25 = .8000 | 20/73 = .2739 |
| $t = .1400$ | 21/81 = .2592 | 21/21 = 1.000 | 15/25 = .6000 | 15/21 = .7142 |

TABLE 10

Retrieval of Articles in the MEDLARS File from Selected Set of 5 Journals

| | 30 Articles in MEDLARS File Cited by Review Article | | 12 Articles in MEDLARS File Selected by Subject Experts | |
|---|---|---|---|---|
| | Recall | Precision | Recall | Precision |
| $t = .0000$ | 20/30 = .6666 | 20/37 = .5405 | 10/12 = .8333 | 10/37 = .2702 |
| $t = .1000$ | 12/30 = .4000 | 12/20 = .6000 | 8/12 = .6666 | 8/20 = .4000 |
| $t = .1400$ | 6/30 = .2000 | 6/6 = 1.000 | 6/12 = .5000 | 6/6 = 1.000 |

We claim:

1. A method for selecting a core collection of objects from an overall source collection, wherein the objects have directed relations with each other and the numbers of directed relations of each object from the other objects of the source collection are given data, comprising the steps of:

(1) computing from said data a highest number of directed relations of an object with other objects of the source collection and selecting it as a starter object;

(2) computing frequencies of directed relations of all objects of the source collection from the starter object as measures of probabilities of relevance of the other objects with the starter object; and (3) selecting a threshold relevance value, identifying all objects of the source collection having relevance probabilities with the starter object exceeding the threshold relevance value as a desired set of identified objects, and repeating steps (2) and (3) for each identified object until no new objects are identified, whereby the set of identified objects are taken as a core collection of high-relevance objects selected from the overall source collection.

2. The method according to claim 1, further comprising a step (4) of determining dominance relations between every two identified objects having directed relations based upon a comparison of their relevance probabilities to each other, and ordering the identified objects in accordance with their dominance relations.

3. The method according to claim 2, further comprising a step (5) of ordering the identified objects in accordance with their dominance relations as a digraph tree, and identifying the roots and branch points of the digraph tree as an ordering of dominant objects.

4. A method for selecting a core collection of journals from an overall source collection, wherein the journals have directed relations with each other in the form of citation of other journals by a journal, and the numbers of citations of other journals by each journal are given data, comprising the steps of:

(1) computing from said data a highest number of citations of a journal by other journals of the source collection and selecting it as a starter journal;

(2) computing frequencies of citation of other journals of the source collection from the starter journal as measures of probabilities of relevance of the other journals to the starter journal; and (3) selecting a threshold relevance value, identifying all journals of the source collection having relevance probabilities to the starter journal exceeding the threshold relevance value as a desired set of identified journals, and repeating steps (2) and (3) for each identified journal until no new journals are identified, whereby the set of identified journals are taken as a core collection of high-relevance journals selected from the overall source collection.

5. The method according to claim 1, further comprising a step (4) of determining dominance relations between every two identified journals having citation relations based upon a comparison of their relevance probabilities to each other, and ordering the identified journals in accordance with their dominance relations.

6. The method according to claim 5, further comprising a step (5) of ordering the identified journals in accordance with their dominance relations as a digraph tree, and identifying the roots and branch points of the digraph tree as an ordering of dominant journals.

7. The method according to claim 6, wherein the roots and branch points of the digraph tree are ordered in accordance with their dominance relations as a condensation graph.

8. The method according to claim 4, wherein the threshold relevance value is selected at a maximal value representing the highest probability of relevance of another journal of the source collection with the starter journal.

9. The method according to claim 4, wherein journals having citation relations with each other form a bi-communication class of journals, and the threshold relevance value is selected at a lowest relevance probability value towards 0 at which a last bi-communication class of journals can be identified from the source collection of journals.

10. The method according to claim 1, wherein the objects are published papers that have bibliographic references to other published papers of the source collection of published papers, and said method is applied for retrieval of high-relevance published papers from said source collection.

11. A computer system, including program means and a database storage, for selecting a core collection of journals from an overall source collection, wherein the journals have directed relations with each other in the form of citation of other journals by a journal, and the numbers of citations of other journals by each journal are given as citation number data of the database, comprising:

first program means for computing, from the citation number data, a highest number of citations of a journal by other journals of the source collection and selecting it as a starter journal;

second program means for computing, from the citation number data, frequencies of citation of other journals of the source collection from the starter journal as measures of probabilities of relevance of the other journals to the starter journal;

third program means for inputting a selection of a threshold relevance value, for identifying all journals of the source collection having relevance probabilities to the starter journal exceeding the threshold relevance value, and for re-executing said determining of a starter journal by said first program means and said computing of the probabilities of relevance by said second program means for each identified journal until no new journals are identified, and output means for providing a listing of the identified journals as a core collection of high-relevance journals selected from the overall source collection.

12. The system according to claim 11, further comprising fourth program means for determining dominance relations between every two identified journals having citation relations based upon a comparison of their relevance probabilities to each other, and for ordering the identified journals in accordance with their dominance relations.

13. The system according to claim 12, further comprising fifth program means for ordering the identified journals in accordance with their dominance relations as a digraph tree, and for identifying the roots and branch points of the digraph tree as an ordering of dominant journals.

* * * * *